(12) United States Patent
Viereck et al.

(10) Patent No.: US 6,709,496 B2
(45) Date of Patent: Mar. 23, 2004

(54) AIR DEMOISTURIZER FOR OIL-INSULATED TRANSFORMERS, CHOKES AND TAP CHANGERS

(75) Inventors: Karsten Viereck, Regenstauf (DE); Rainer Brill, Nidda (DE); Kurt Kugler, Hainsacker (DE); Werner Krüger, Reichelsheim (DE)

(73) Assignee: Messko Albert Hauser GmbH & Co. KG, Oberursel (DE)

( * ) Notice: Subject to any disclaimer, the term of this patent is extended or adjusted under 35 U.S.C. 154(b) by 0 days.

(21) Appl. No.: 10/293,888

(22) Filed: Nov. 13, 2002

(65) Prior Publication Data

US 2003/0089238 A1 May 15, 2003

(30) Foreign Application Priority Data

Nov. 13, 2001 (DE) .......................................... 101 55 511

(51) Int. Cl.[7] .......................... B01D 53/02; H01F 27/14
(52) U.S. Cl. .............................. 96/111; 96/112; 96/115; 96/136; 96/146; 96/329; 336/58; 174/74 R
(58) Field of Search ........................... 96/111, 112, 115, 96/134, 136, 143, 146, 278, 329, 371; 55/385.1, 385.6; 336/58; 174/74 R, 15.1

(56) References Cited

U.S. PATENT DOCUMENTS

| | | | | |
|---|---|---|---|---|
| 2,083,732 A | * | 6/1937 | Moore et al. ................. | 96/126 |
| 2,505,581 A | * | 4/1950 | Unger ...................... | 174/14 R |
| 3,448,038 A | * | 6/1969 | Pall et al. .................... | 208/187 |
| 4,437,082 A | * | 3/1984 | Walsh et al. .................. | 336/58 |
| 4,543,446 A | * | 9/1985 | Foss et al. ................ | 174/11 R |
| 5,902,381 A | * | 5/1999 | Golner et al. ................. | 96/146 |

FOREIGN PATENT DOCUMENTS

| | | |
|---|---|---|
| DE | 34 13 071 | 10/1985 |
| DE | 34 13 888 | 10/1985 |
| DE | 34 13 888 A1 | 10/1985 |
| DE | 196 48 208 | 5/1998 |
| DE | 201 04 259 | 6/2001 |
| DE | 201 04 259 | 7/2001 |
| EP | 0 245 598 | 11/1987 |
| EP | 0 746 000 | 12/1996 |
| JP | 60 198710 | 10/1985 |
| JP | 62-205608 A * | 9/1987 |

OTHER PUBLICATIONS

Patent Abstracts of Japan, vol. 010, No. 042 (E–382)—Feb. 19, 1986 and JP 60 198710 A (Toshiba KK).

* cited by examiner

Primary Examiner—Frank M. Lawrence
(74) Attorney, Agent, or Firm—Herbert Dubno

(57) ABSTRACT

An air demoisturizer for an oil expansion vessel of an electrical power unit like an oil-filled transformer, tap changer or choke, has a heating element in the body of absorbent and utilizes a heat-regeneratable absorbent which is cut off by a moisture detector from the oil expansion vessel when the absorbent is saturated and is thermally regenerated. The demoisturizing column is provided in line with an oil receiver through which the dry air is passed before reaching the oil expansion vessel.

17 Claims, 4 Drawing Sheets

AIR DEMOISTURIZER FOR OIL-INSULATED TRANSFORMERS, CHOKES AND TAP CHANGERS

FIELD OF THE INVENTION

Our present invention relates to an air demoisturizer for electric power apparatus like power transformers, power chokes and other inductive equipment, tap changers and like apparatus which is oil-insulated or oil-cooled and which usually includes an oil expansion vessel or tank which can be connected to an external source of air, which must be demoisturized.

BACKGROUND OF THE INVENTION

The provision of an air demoisturizer to remove moisture from the atmospheric air is supplied to an oil-expansion tank of oil-insulated power equipment is described, for example, in DE 201 04 259 U1.

The apparatus described in that German patent document comprises a receptacle containing a dehumidifying agent, i.e. an absorbent, in conjunction with an oil receiver through which the moisturized or dehumidified air is supplied to the oil-expansion tank or vessel of the power equipment.

An oil-filled transformer generally has such an oil expansion vessel in order to compensate for volume changes in the transformer oil resulting from temperature fluctuations. Since the air which is drawn into the expansion tank cannot carry any moisture into the system without decreasing the breakdown voltage of the insulating oil, the demoisturizer or dehumidifier is as a rule provided to treat the air admitted to the expansion vessel. The air which is drawn into this vessel can also be passed through an oil reservoir as noted as a prevention of contamination of this air as dried in the dehumidifier.

The basic structure of such an air demoisturizer can be found in the German Industrial Standard DIN 42 562, parts 1 and 2, and the demoisturizer absorbent can be, for example, a silica gel.

EP 0 245 598 deals generally with gas cushions for transformers and the like for compensating for the thermal expansion and contraction of the transformer oil.

EP 0 746 000 describes how the insulating oil of a transformer may be kept dry utilizing silica gel.

DE 34 13 071 describes an air demoisturizer for a transformer.

DE 34 13 888 is directed to a device for maintaining an electric insulating system free from hygroscopicity.

If one considers the art as a whole, it will become apparent that the moisture absorbing agents which have been used can be subdivided into two major groups. One of these groups includes materials like zeolites which only can take up a limited amount of water before they reach a saturation point and lose their drying properties and must be replaced. The other major group consists of materials like silica gel which has already been mentioned and the so-called KC DRYING BEADS ORANGE which only bind water physically and then can be restored to their original dry state by a heating, thereby eliminating the need to replace the material itself. In the past, however, in the application previously described, this heating was effected only following complete separation of the dehumidifier from the apparatus, dismounting of the demoisturizer and heating in accordance with German Industrial Standard DIN 42 562 in an appropriate device.

DE 201 04 259 mentioned previously describes an air demoisturizer which is equipped with control contacts which forms part of a monitoring unit for monitoring the moisture content of the moisture-absorbing medium. Instead of a replacement of the absorbent on a time basis, therefore, replacement of the absorbent occurs as need arises because of moisture build-up in the absorbent. When the monitoring device indicates that the absorbent is saturated with water, a signal for replacement of the absorbent is emitted. The replacement of the medium itself is effected as in the art and the system of this patent publication can thus provide only better utilization of the absorbent since the replacement is then matched to the occurrence of saturation.

In practice, the entire approach of replacing the absorbent is inconvenient. The connection of the expansion duct to the transformer must be closed, the entire demoisturizer must be dismounted, the individual compartments of the system must be emptied and a new fresh absorbent must be introduced. The amount of absorbent used is usually 1.2 to 4.5 kilograms and thus the entire process is expensive, inconvenient and time-consuming.

OBJECTS OF THE INVENTION

It is, therefore the principal object of the present invention to provide an improved air demoisturizer which eliminates the drawbacks of prior art demoisturizers for the purposes described.

Another object of the invention is to provide an air demoisturizer in which replacement of the absorbent is no longer required and which allows the demoisturizer to regenerate the absorbent in situ to restore its dehumidifying function after it has been saturated with water.

It is also an object of this invention to reduce the operating cost and the down time of power equipment provided with the air demoisturizing of the invention.

SUMMARY OF THE INVENTION

These objects and others which will become apparent hereafter are attained, in accordance with the invention with an air demoisturizer in which the air-permeable body of the absorbent capable of regenerating by heating from a saturated state to the absorbent, can be heated by a heater so disposed in or on the receptacle as to heat the body to regenerate the absorbent.

More particularly, the air demoisturizer for an oil-expansion vessel of an oil-insulated electrical apparatus can comprise:

a receptacle containing an air-permeable body of a moisture absorbent capable of regeneration by heating from a saturated state of the absorbent, and having an air inlet on one side of the body and an air outlet on an opposite side of the body;

an oil receiver connected to the air outlet of the receptacle and containing an oil bath through which demoisturized air from the receptacle is conducted, the oil receiver having a discharge port formed above the bath and connectable with the oil-expansion vessel of the electrical apparatus;

a monitoring unit responsive to moisture in the body for indicating a moisture content thereof; and a heater positioned to heat the body in the receptacle to regenerate the absorbent.

The oil receiver advantageously comprises a riser extending through the oil sump and communicating with the air outlet, and a bell over the riser and reaching downwardly into the bath.

The heater can be an electrical resistance heater which can include individual heating elements received in the body and surrounded by absorbent, i.e. heating elements which are directly in contact with the absorbent.

The invention thus utilizes a drying agent or absorption agent which is provided with an electric heater and which can be heated to regenerate that absorbent in situ, the heater being controlled in response to the moisture-content state of the absorption agent or as a function of time. The absorbent can be heated and dried upon reaching the moisture-saturation point and thereby is returned to an operable state for absorbing moisture. The absorption agent can be an air-permeable solid body or a mass of particles, e.g. granules, in which the heater is embedded and the liquid liberated by heating can be discharged downwardly, e.g. as droplets. As a consequence the oil receiver is preferably located above the receptacle containing the absorbent. The apparatus can be provided with a temperature monitoring element which can cut off the heating when the temperature in the absorbent exceeds a limiting temperature to prevent over-heating.

The electrical connection and contact elements for the heater can be provided in a switch housing which can be disposed laterally of the demoisturizer. The moisture sensor which is normally provided to monitor the moisture content of the air emerging from the demoisturizer can also be mounted in or on this switch housing and can have its control circuitry built into the latter.

The magnetic valve can be provided between the receptacle and the oil receiver or between the oil receiver and the oil-expansion tank to cut off flow of air to the oil-expansion tank during the operation of the heater to regenerate the absorbent.

The electric heating can be effected in various ways. For example, it can be turned on (once the magnetic valve is closed) when the moisture sensor detects saturation of the demoisturizer, i.e. when the moisture content of the air about to be drawn into the oil-expansion tank, triggers a signal that the moisture content is impermissibly high. The heating element is then turned on as a function of the state of saturation of the absorbent.

The heater can also be turned on cyclically, e.g. every 48 hours, in a time-dependent operation. Both methods can be combined. It is however also possible to operate the heating based upon external information, such as by means of a transformer-monitoring system, or example, using "Transformer Management System TMS®" of the assignee of this application.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
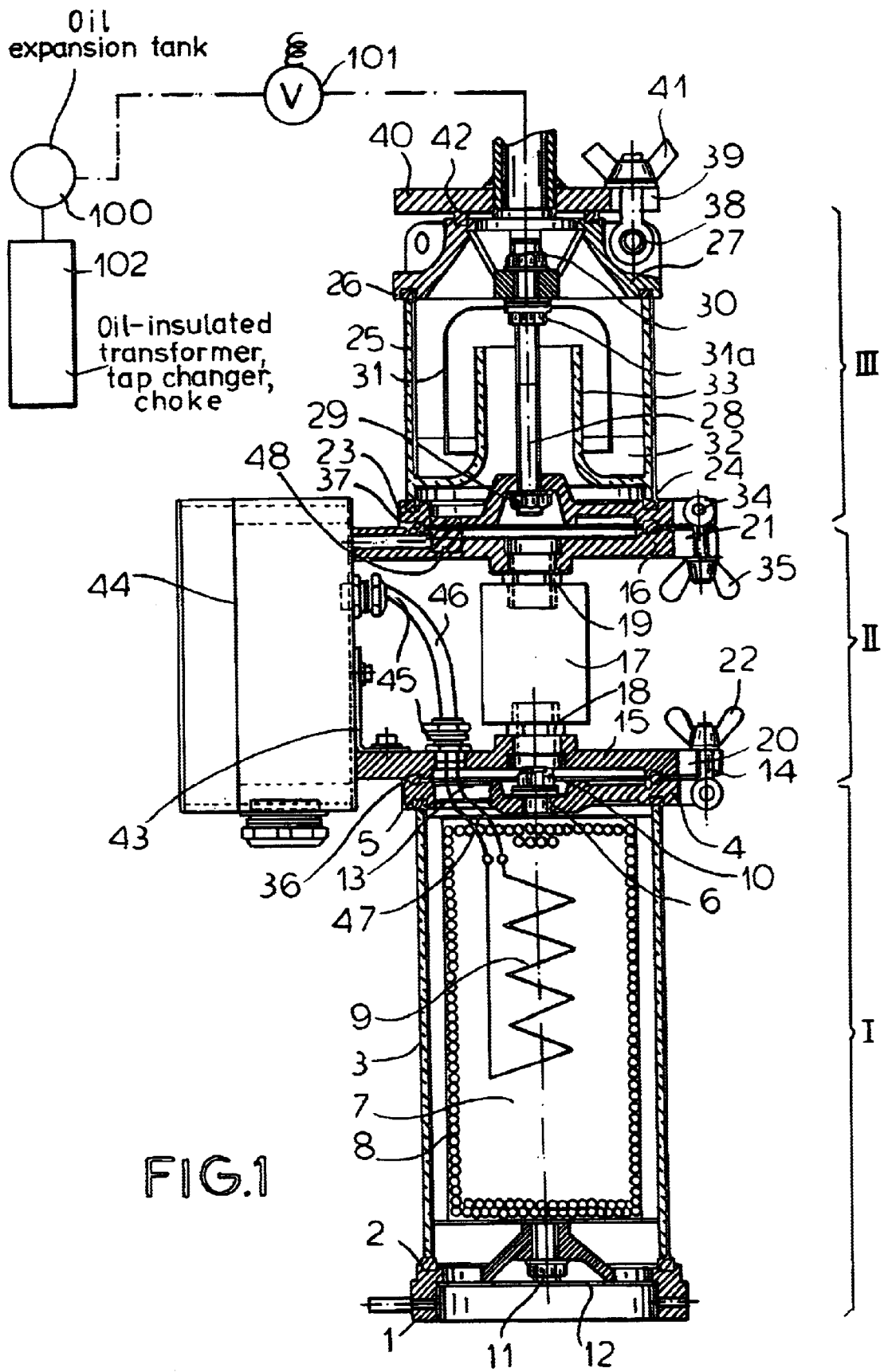
FIG. 1 is a vertical cross sectional view through an air demoisturizer illustrating the invention.
Figure 2:
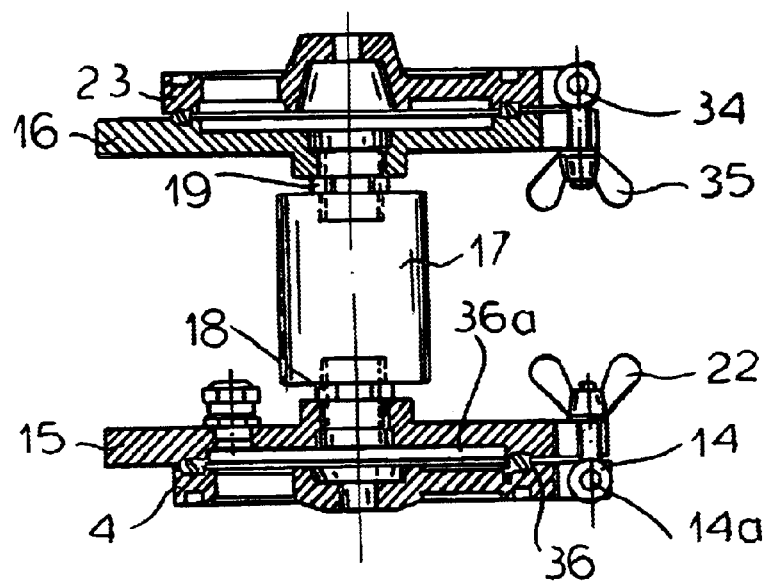
FIG. 2 is a detail of the connection between two of the components of the air demoisturizer in FIG. 1.
Figure 3:
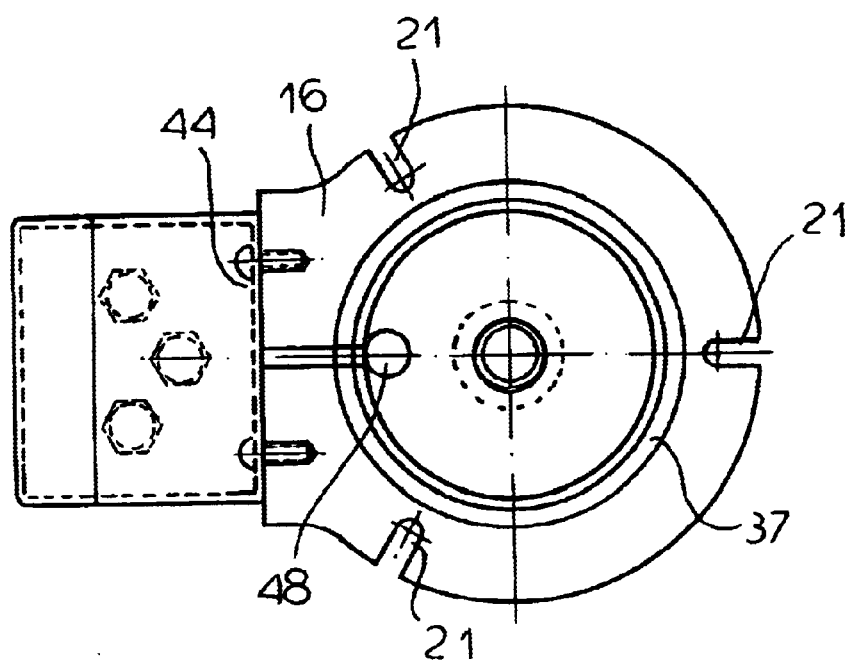
FIG. 3 is a view of the upper flange of this coupling system shown alone and in a plan view.
Figure 4:
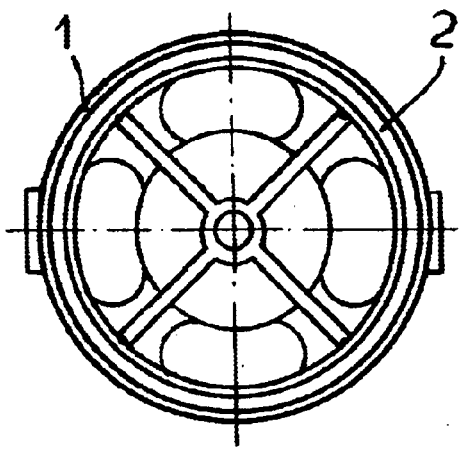
FIG. 4 is a plan view of the bottom ring seen alone.
Figure 5:
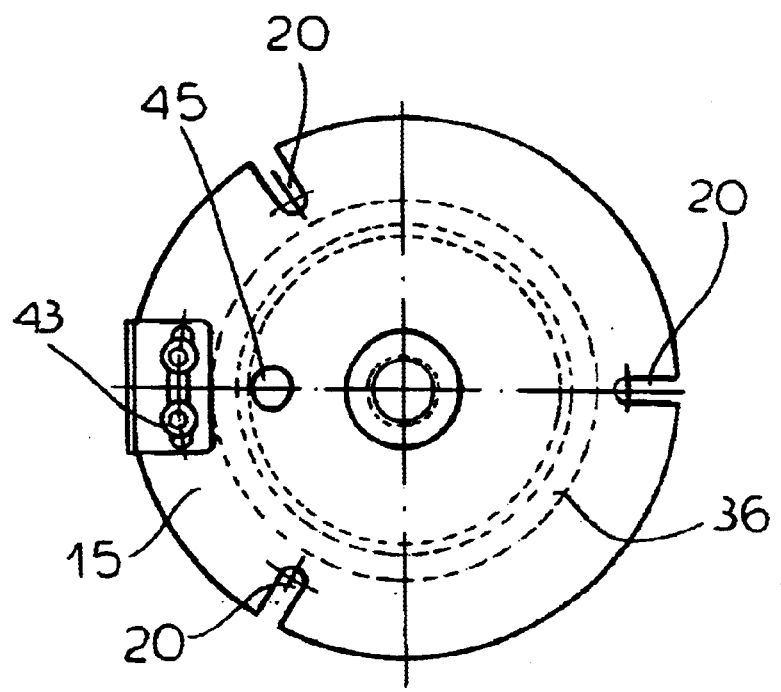
FIG. 5 is a plan view of the lower flange alone.
Figure 6:
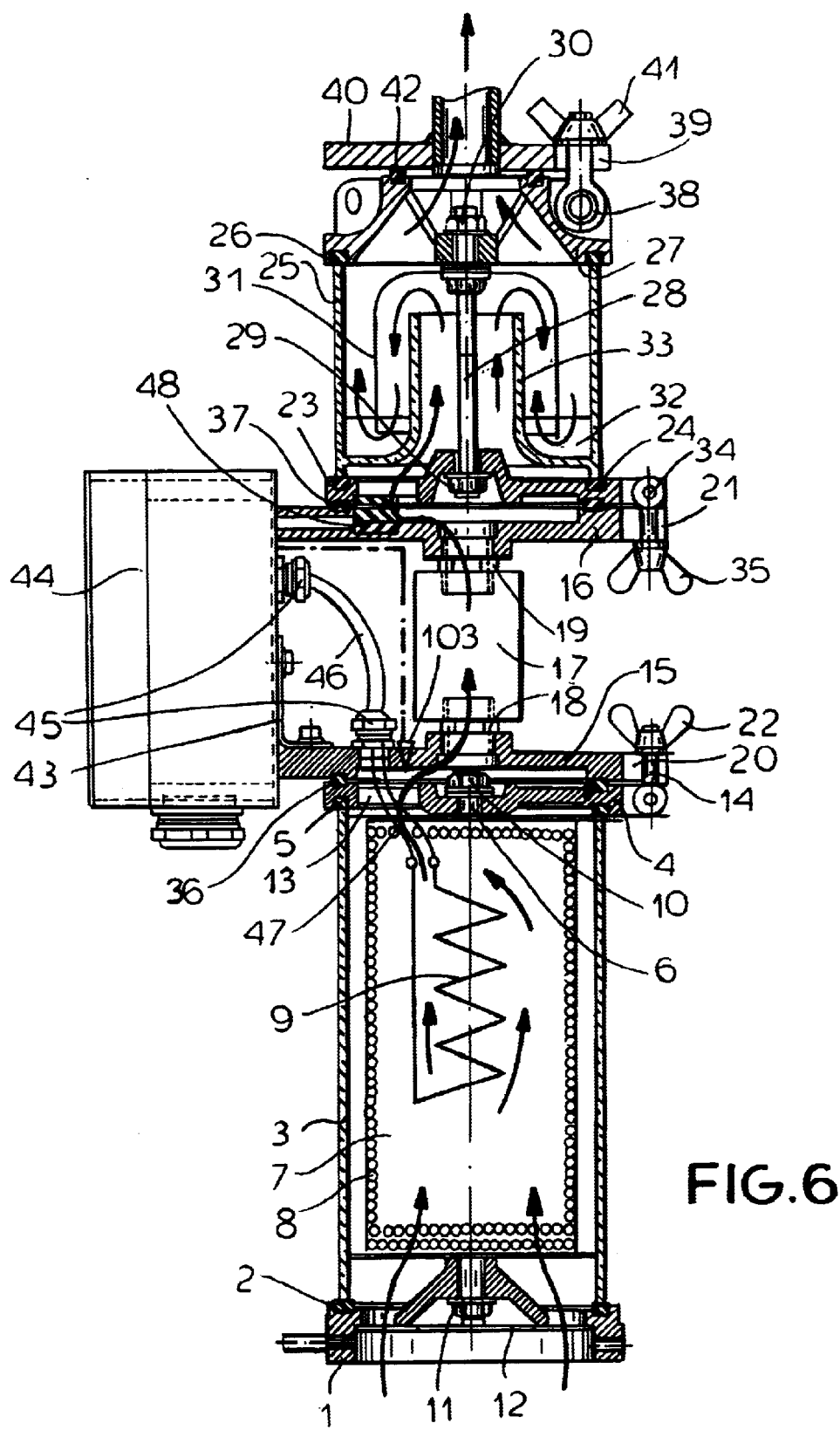
FIG. 6 is a cross sectional view of a complete air demoisturizer in section according to the invention but showing the path of the air through the system.

The demoisturizing unit illustrated in FIGS. 1 and 6 is used primarily to supply dehumidified air to, for example, an oil expansion tank 100 through a magnetic valve 101 for an electric power apparatus represented diagrammatically at 102 and consisting of an oil-insulated transformer, tap changer or choke.

The air demoisturizer is comprised of three major components which have been indicated at I, II and III in FIG. 1.

The first component I comprises a bottom ring 1 in which an annular seal 2 is received and which is clamped against the bottom edge of a cylinder 3 by a nut 11 which engages a threaded rod or stem 6.

The cylinder 3 sealingly engages at its upper edge a plate 4 which receives the rod 6 and has an annular seal 5 against which this edge bears.

The threaded rod 6 runs vertically along the axis of the cylinder 3 which surrounds a housing 7 open at its upper and lower ends and containing a thermally regeneratable body 8 of granules or an otherwise thermally regenerated air-permeable absorbent. The absorbent may be, for example, KC DRYING BEADS ORANGE as noted previously.

Within the body of granules is a resistance heating element 9 which is surrounded by the granules.

The granulate 8 is thus moisture absorbent and can dry the air which passes through the housing 7 to an outlet opening 13 in the plate 4. The cylinder is clamped between nuts 11 and via washers which have not been indicated.

The assembly 1 is provided with a sieve plate 12 at its bottom end of the opening 13 in the upper plate 4 can communicate with a chamber in a flange 15. Eye bolts 14 which can pivot about pins 14a can engage in slots 20 of the flange 15 so that the plate 4 can be clamped against the flange 15 by the wing nut 22. The water liberated from the granulate 8 by the heating can pass outwardly through the sieve plate 12 and drop freely downwardly.

A circular seal 36 is provided between the plate 4 and the flange 15 and surrounds a chamber 36a in the flange 15 which receives the dry air from the absorbent body 8.

The second major component II couples the absorbent receptacle of component I with the oil receiver component III and comprises the flange 15 at its lower end and a similar flange 16 at its upper end. Between the flanges 15 and 16 a magnetic valve 17 is provided. The magnetic valve is connected with the upper and lower flanges by pipe nipples 18 and 19. Just as the lower flange has slots 20 to receive the eye bolts 14, the upper flange has slots 21 to receive corresponding eye bolts 34 onto which wing nuts 35 are threaded to clamp the plate 23 of the oil receiver component onto the upper flange 16 against an annular seal 37.

The oil receiver is thus axially aligned with the absorbent receptacle.

The third component III is closed at its bottom by the plate 23 in which an annular seal 24 is recessed. The cylindrical receiver 25 has a downwardly-turned edge engaging this seal and an upper edge bearing against the annular seal 26 of a cover 27.

The threaded tie rod 28 clamps the cover 27 against the bottom plate 23 via nuts 29 and 30 at the lower and upper ends respectively. Within the receiver 25 is a downwardly open bell 31 held by a nut 31a on the rod 28 and extending over a riser 33 forming an inner wall coaxial with the receiver 25. The lower edge of the bell lies below the upper level of the oil bath in the sump 32. The volume of the soil sump 32 is limited by the tulip-shaped inner wall formed by the riser 33.

The three components thus are simply connected together and can easily be separated by loosening of the wing nuts.

The assembly is mounted on a pipe flange 40 connected to the line delivering the moisture free air to the oil expansion tank by another set of wing nuts 41 threaded onto swingable eye bolts 38 which engage in slots 39 of the pipe flange. The air demoisturizing comprised of the components I, II and III can be preassembled and mounted on the pipe flange 40 by the wing nuts 41 and the eye bolts 38 with the aid of an annular seal 42.

The second component II may be provided laterally with an angle bracket 43 on which a switch housing 44 is mounted which provides the electrical connections and the connecting lines for the moisture monitor, the heating elements 9, any temperature sensor connected to a limiter preventing overheating of the absorbent, etc. For example, cable connectors 45 can be mounted in the housing 44 and on the flange 15 for the cable 46 supplying the heating elements 9. A moisture sensor 48 can be provided in the upper flange 16 so that it is traversed by the air flowing through this flange into the oil receiver and can be used to turn on the heater and close the magnetic valves 17 and 101 when the absorbent is saturated with water. Moisture sensors of this type are commercially available.

The arrows in FIG. 6 show the path of the air through the system. The air which is sucked into the oil expansion tank, passes from the bottom initially through the housing 7 with the granulate 8. In the construction shown in FIGS. 1 and 6 the air enters at the lower end of the housing 7 and meanders through the granulate 8 to emerge at the upper end of the housing 7 as dehumidified or dry air.

Other flow paths through the absorbent can also be used. For example, the air can be caused to flow radially inwardly into the cylindrical bed of the granulate and then out through an end, inwardly through the bed laterally and out of the bed laterally to be collected on the end and inwardly and outwardly through the bed by appropriate baffles. The various types of filters and their housing arrangements will be known to the art since the manner in which the air traverses the absorbent can be entirely conventional. What is important is that the dry air can pass upwardly without mixing with the damp air through the magnetic valve 17 and past or through the moisture sensor 48 into the oil receiver.

The air, as it passes into the oil receiver flows initially through the riser 33 and then is deflected downwardly into the oil bath in the sump 32 before passing upwardly through the cover and to the oil expansion tank shown in FIG. 1. The moisture sensor 48 determines the residual moisture in the dried air and, upon detection of a moisture content which exceeds the maximum permissible moisture content, a sign that the absorbent has been saturated, cuts off the magnetic valve 17 or the magnetic valve 101 and turns on the heater 9.

The moisture sensor 48 is shown to be located between the top of component II and the bottom of component III but can be located elsewhere along the path of the dried air.

A temperature sensor 103 can also be connected to circuitry in the switch housing 44 to cut off the heater 9 should the temperature rise precipitously in the absorbent or reach a overheating level.

The circuit means within the switch housing 44 has not been shown in detail but serves to energize the heating device 9 which, as noted, can be a resistance heater and to close the magnetic valves 17 or 101. The absorbent is heated until it is dry and water released drops downwardly from the sieve plate 12 freely. After a certain time which can be determined by the amount of absorbent in the cylinder 7, the heating unit 9 is turned off and the magnetic valves 17, 101 are reopened. The granulate 8 which has thus been dried, is available to remove water from the air drawn into the oil expansion tank. The sensor 48 can also be used in conjunction with an external transformer monitoring system which can provide a timer or other switch means to turn off the heater. The heater can also be turned off manually.

In the system of the invention the arrangements of the bell 31 and the oil sump 32 has been changed with respect to state of the art systems. Usually these elements are provided below the air demoisturizer. In the present case they are provided above the air demoisturizer so that water released from the granulate can drop freely into the open without being collected in the oil sump.

We claim:

1. An air demoisturizer for an oil-expansion vessel of an oil-insulated electrical apparatus, said air demoisturizer comprising:

a receptacle containing an air-permeable body of a moisture absorbent capable of regeneration by heating from a saturated state of said absorbent, and having an air inlet on one side of said body and an air outlet on an opposite side of said body;

an oil receiver connected to said air outlet of said receptacle and containing an oil bath through which demoisturized air from said receptacle is conducted, said oil receiver having a discharge port formed above said bath and connectable with the oil-expansion vessel of said electrical apparatus;

a monitoring unit responsive to moisture in said body for indicating a moisture content thereof; and a heater positioned to heat said body in said receptacle to regenerate said absorbent.

2. The air demoisturizer defined in claim 1 wherein said oil receiver comprises an oil sump containing said bath, a riser extending through said oil sump and communicating with said said air outlet, and a bell over said riser and reaching downwardly into said bath.

3. The air demoisturizer defined in claim 2 wherein said heater is an electrical resistance heater.

4. The air demoisturizer defined in claim 3 wherein said heater includes individual heating elements received in said body and surrounded by said absorbent.

5. The air demoisturizer defined in claim 2 wherein a moisture sensor is provided and is connected to control said heater.

6. The air demoisturizer defined in claim 5 wherein said moisture sensor is disposed above said receptacle and in a path of the demoisturized air.

7. The air demoisturizer defined in claim 2, further comprising a time control for said heater.

8. The air demoisturizer defined in claim 2, further comprising an external monitoring system for controlling operation of said heater.

9. The air demoisturizer defined in claim 8 wherein said external monitoring system is a transformer monitoring system.

10. The air demoisturizer defined in claim 2 wherein said oil receiver is disposed above and aligned with said receptacle.

11. The air demoisturizer defined in claim 2, further comprising a magnetic valve between said receptacle and said receiver for cutting off air flow during heating of said body.

12. The air demoisturizer defined in claim 2, further comprising a magnetic valve between said receiver and said vessel for cutting off air flow during heating of said body.

13. The air demoisturizer defined in claim 2 wherein said apparatus is an electrical power transformer.

14. The air demoisturizer defined in claim 2 wherein said apparatus is an electrical power choke.

15. The air demoisturizer defined in claim 2 wherein said apparatus is an electrical power tap changer.

16. The air demoisturizer defined in claim 5, further comprising a temperature monitor for monitoring the temperature generated by said heater in said body to prevent overheating thereof.

17. The air demoisturizer defined in claim 2, further comprising a switch housing laterally of said receptacle and containing said monitoring unit.

* * * * *